United States Patent
Lecky

(10) Patent No.: US 9,830,485 B1
(45) Date of Patent: Nov. 28, 2017

(54) PICK VERIFICATION USING MOVING RFID TAGS

(71) Applicant: Amazon Technologies, Inc., Seattle, WA (US)

(72) Inventor: Ned Lecky, Vashon, WA (US)

(73) Assignee: Amazon Technologies, Inc., Seattle, WA (US)

(*) Notice: Subject to any disclaimer, the term of this patent is extended or adjusted under 35 U.S.C. 154(b) by 2 days.

(21) Appl. No.: 15/283,487

(22) Filed: Oct. 3, 2016

Related U.S. Application Data

(62) Division of application No. 14/467,760, filed on Aug. 25, 2014, now Pat. No. 9,489,655.

(51) Int. Cl.
*G06F 19/00* (2011.01)
*G06F 17/00* (2006.01)
*G06K 7/10* (2006.01)

(52) U.S. Cl.
CPC ..... *G06K 7/10366* (2013.01); *G06K 7/10128* (2013.01)

(58) Field of Classification Search
CPC .. G06Q 10/08; G06Q 10/0833; G06Q 10/087; G06Q 10/0875; G06K 7/10108; G06K 7/10118; G06K 7/10128
See application file for complete search history.

(56) References Cited

U.S. PATENT DOCUMENTS

| | | | |
|---|---|---|---|
| 7,504,949 B1 | 3/2009 | Rouaix et al. | |
| 7,579,952 B2* | 8/2009 | Osterholt | B66F 9/24 340/572.1 |
| 7,609,163 B2* | 10/2009 | Shafer | G01S 7/352 340/10.3 |
| 8,006,902 B2* | 8/2011 | Garber | G06K 7/0008 235/375 |
| 8,325,019 B2 | 12/2012 | Liu et al. | |
| 8,502,673 B2 | 8/2013 | Garber et al. | |
| 9,208,306 B2 | 12/2015 | Davis | |
| 2008/0211622 A1 | 9/2008 | Rindtorff et al. | |
| 2012/0169478 A1* | 7/2012 | Spindel | G06K 7/0008 340/10.6 |
| 2014/0118147 A1 | 5/2014 | Davis | |
| 2015/0186700 A1* | 7/2015 | Nikitin | G06K 7/10009 340/10.1 |
| 2015/0379317 A1 | 12/2015 | Kelly et al. | |
| 2015/0379459 A1 | 12/2015 | Russell et al. | |
| 2016/0023351 A1 | 1/2016 | Kuffner et al. | |

\* cited by examiner

*Primary Examiner* — Thien M Le
*Assistant Examiner* — April Taylor
(74) *Attorney, Agent, or Firm* — Thomas Horstemeyer, LLP

(57) ABSTRACT

Disclosed are various embodiments for pick verification using moving radio frequency identification (RFID) tags. A robotic picker moves an item storage structure within range of a radio frequency identification (RFID) tag reader, wherein the item storage structure comprises multiple items and the items each have an RFID tag affixed. The RFID tag reader emits an electric field. The robotic picker moves the item storage structure while the RFID tag reader emits the electric field. An RFID tag identification device receives responses from energized RFID tags affixed to the items. The RFID tag identification device determines that an energized RFID tag is in motion and selects an identifier broadcast by the energized RFID tag that is in motion.

20 Claims, 12 Drawing Sheets

PICK VERIFICATION USING MOVING RFID TAGS

CROSS REFERENCE TO RELATED APPLICATIONS

This application is a division of copending U.S. patent application Ser. No. 14/467,760, entitled "DISTINGUISHING RFID TAGS USING MOTION DATA" and filed on Aug. 25, 2014, which is hereby incorporated by reference herein in its entirety.

BACKGROUND

Shipments of items are often assembled and fulfilled from distribution or fulfillment centers where the items are stored. Items are retrieved from the inventory located at the distribution or fulfillment center by employees, packed, and shipped. Items in the inventory in the distribution or fulfillment center may be stored in one or more locations within the distribution or fulfillment center.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
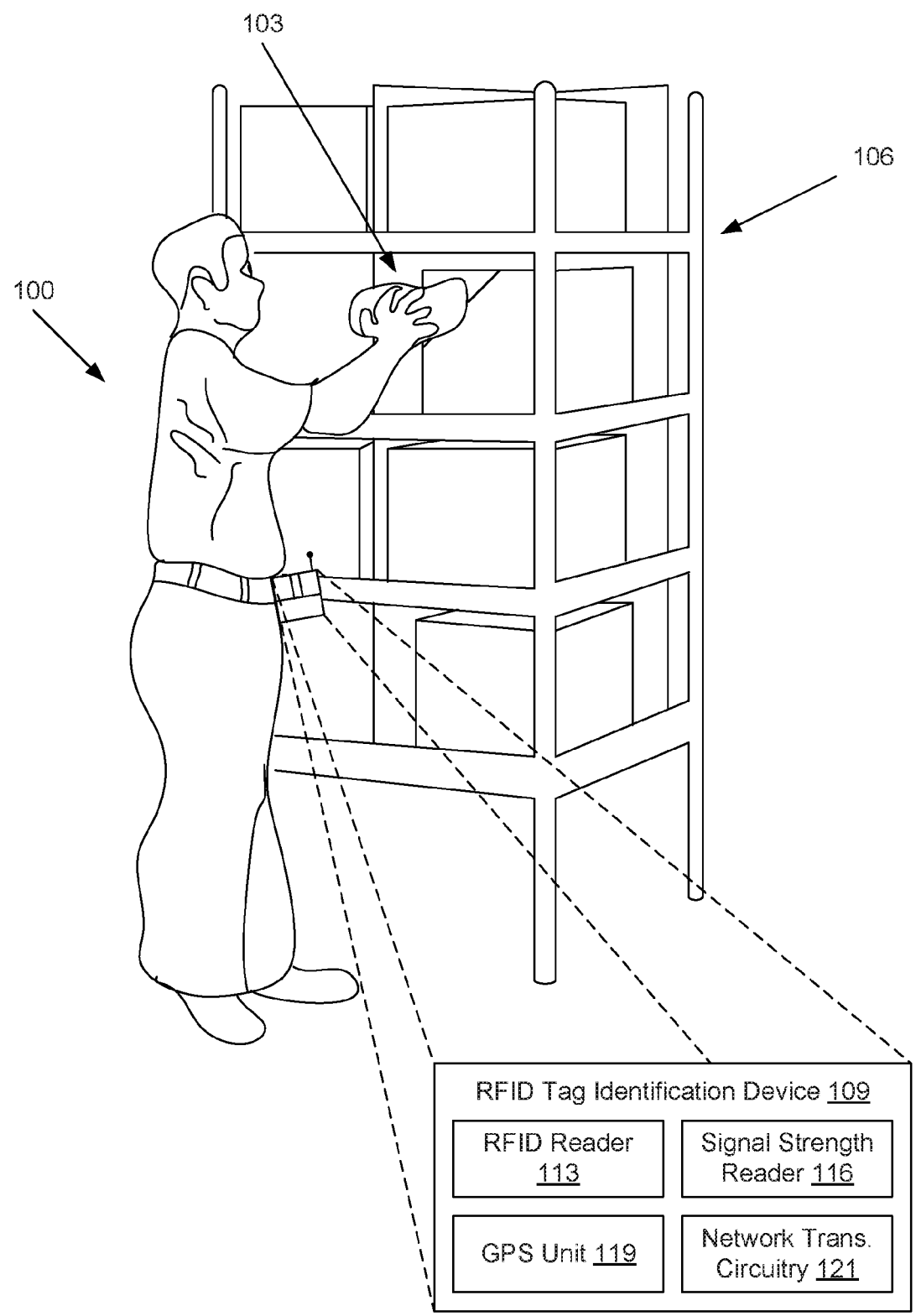
FIG. 1A is a drawing depicting a picker retrieving an item from a storage location and a schematic block diagram illustrating a RFID tag identification device of the picker.

The present disclosure involves various embodiments for verifying, with various radio frequency identification (RFID) devices, that items in a distribution or fulfillment center have been correctly retrieved for fulfillment of an order. A fulfillment center may be any one of a number of material handling facilities, such as a warehouse, distribution center, or similar facility. When fulfilling a given shipment corresponding to a customer order, one or more pickers on pick routes stop at item locations mapped to the shipment to retrieve the items to be shipped. In various embodiments, some items retrieved by a picker may have a corresponding RFID tag. In some embodiments, the picker may also be equipped with an RFID tag identification device, which may be used to read the RFID tag in order to verify that an item retrieved by the picker is the correct item for fulfilling the shipment for the customer order and/or read the RFID tag for other purposes. However, the RFID tag identification device may, in some embodiments, be attached to a cart, hand truck, forklift, or other apparatus which the picker may move while retrieving items. In other embodiments, one or more stationary RFID tag identification devices may be located throughout the fulfillment center. Stationary RFID tag identification devices may be located near one or more item locations to track and monitor RFID tags at the item locations. In various embodiments, a picker may also be equipped to move a bin, pallet, set of shelves, and/or other item storage structure to an RFID reader station, where all of the RFID tags within the item storage location may be read to verify inventory accuracy.

In some embodiments, individual RFID tags may be identified based on motion data transmitted by the individual RFID tags. Each of the RFID tags may have an accelerometer, velocimeter, or other instrument that reports a speed, acceleration, direction of movement, current position, and/or other such data. For example, multiple RFID tags may be energized by an RFID reader or RFID tag identification device and broadcast data, such as a unique identifier of the RFID tag and/or motion data of the RFID tag, in response to being energized. However, the motion data can be used to isolate an RFID tag from the remaining RFID tags for further analysis.

As an illustrative and non-limiting example, multiple items with RFID tags may be in proximity to each other. A picker, as discussed above, may retrieve an item and scan it with an RFID reader. However, both the retrieved items and the other items may transmit in response to being scanned and energized by the RFID reader. But by analyzing motion data broadcast by each of the RFID tags, the RFID tag corresponding to the item that has been retrieved by the picker may be uniquely identified. For example, if only a single RFID tag reports motion data, then the item corresponding to the moving RFID tag may be identified as having been retrieved by the picker. As another example, if multiple RFID tags report motion, such as both the item that has been picked and other items that have been shifted, adjusted, nudged and/or jostled in the process, then an RFID tag reporting motion data that matches an expected trajectory of an item being picked may be identified as having been retrieved by the picker. Motion data reported may also be used to isolate and/or identify individual RFID tags in other scenarios, as will be further described herein, including, but not limited to, detecting if an item has been dropped, stolen, and/or misplaced.

In some embodiments, individual RFID tags may also be identified based on changes in the strength of the signal transmitted by the RFID tag. As an RFID tag moves towards or away from a point in space, such as that of an RFID reader, the signal strength of a transmission of the RFID tag will increase or decrease in strength. Further, particular types of motion may correspond to a particular pattern of increases and decreases in signal strength. As illustrative example, the signal strength of an RFID tag of an item moving laterally to an RFID reader may first increase in strength as the item approaches the RFID reader and then decrease in strength as the item moves away from the RFID reader. As another illustrative example, a signal strength for an RFID tag may increase in strength as the RFID tag moves towards the RFID reader. These changes in signal strength can be used to isolate an RFID tag from other RFID tags for further analysis.

As an illustrative and non-limiting example, multiple items with RFID tags may be in proximity to each other. A picker, as discussed above, may retrieve an item and scan it with an RFID reader. However, both the retrieved items and the other items may transmit in response to being scanned and energized by the RFID reader. By analyzing changes in the signal strength of the response of each of the RFID tags, the RFID tag corresponding to the item that has been retrieved by the picker may be uniquely identified. For example, although multiple RFID tags may show some change in signal strength as a result of being adjusted, shifted, nudged, or jostled when the picker retrieves an item, the RFID tag corresponding to the retrieved item may be the only RFID tag reporting a consistent and steady increase in signal strength over time, assuming the RFID reader is positioned with or near the picker. Changes in signal strength may also be used to isolate and/or identify individual RFID tags in other scenarios, as will be further described herein, including, but not limited to, detecting if an item has been dropped, stolen, and/or misplaced.

In the following discussion, a general description of the system and its components is provided, followed by a discussion of the operation of the same. Although the description herein refers to various example embodiments, any example embodiments detailed herein are illustrative in nature. For example, various example embodiments related to picking are detailed herein, the present invention is applicable in other contexts, such as packing, stowing, and/or other materials handling, as well as other fields in which articles, items, and/or individuals may be distinguished from each other using motion data related to RFID tags.

FIG. 1A is an illustration of a picker 100 retrieving an item 103 from an item storage structure 106. Although the picker 100 depicted in FIG. 1A is a human, it is understood that, in various embodiments, the picker 100 may be an autonomous robot or similar device with the ability to retrieve items 103 from an item storage structure 106. The picker 100 has a RFID tag identification device 109. In some embodiments, such as the embodiment depicted, the RFID tag identification device 109 may be attached to the picker 100. In other embodiments, the RFID tag identification device 109 may be a handheld, portable, and/or detachable device. Further, the RFID tag identification device 109 may be attached to a cart, hand truck, forklift, or other apparatus associated with the picker 100. In yet other embodiments, the RFID tag identification device may be a fixed, immobile device placed at a particular location, e.g., a picking station at which the picker 100 may retrieve the item 103 from the item storage structure 106.

The RFID tag identification device 109 includes a radio frequency identification (RFID) reader 113 to read the unique identifier of an RFID tag attached to or otherwise associated with the item 103. The RFID reader 113 included in the RFID tag identification device 109 may also be configured to receive additional information that may be transmitted by an RFID tag, such as motion vectors, acceleration data, and other such data. In some embodiments, the RFID tag identification device 109 may include a signal strength reader or meter 116 in addition to the RFID reader 113. The signal strength reader 116 allows the RFID tag identification device 109 to determine the strength of a signal emitted by a nearby RFID tag. Moreover, the signal strength reader 116 may be used, in some embodiments, to determine whether a signal emitted by a nearby RFID tag is increasing or decreasing in strength based on a series of measurements made over a period of time. These increases or decreases may correspond to a radio transmission or series of radio transmissions of an RFID tag associated with the item 103 as the item 103 is retrieved by the picker 100 and is pulled closer to the picker 100. In various embodiments, the signal strength reader 116 may make multiple measurements of the signals emitted by a nearby RFID tag within a short period of time, wherein the differences between each of the measurements over time is used to determine whether the signals emitted by the nearby RFID tag are increasing or decreasing in strength.

In some embodiments, the RFID reader 113 may be further configured to ignore RFID tags broadcasting with a signal strength below a configurable threshold. In such embodiments, ignoring RFID tags with weaker signals filters out RFID tags that a picker 100 may not wish to have scanned, but respond to signals from the RFID reader 113 due to their proximity to the RFID reader 113. In some embodiments, the RFID tag identification device 109 may also include a global positioning system (GPS) unit 119 or similar circuitry. In these embodiments, the RFID tag identification device 109 is able to determine its location, which can be used to identify a particular item storage structure 106 based at least in part on the location of the RFID tag identification device 109 and/or other data, such as the item 103 that the picker 100 is picking.

The RFID tag identification device 109 may also include network transmission circuitry 121. This network transmission circuitry 121 may include, for example, various wireless networking capabilities such as Bluetooth® or Wi-Fi® networking capabilities. In these embodiments, the RFID tag identification device 109 is able to transmit information to and receive data from remote computing devices. For example, the RFID tag identification device 109 may be configured to use the RFID reader 113 to read an RFID tag associated with the item 103 and transmit information from the RFID tag to a remote computing device, as will be described in further detail herein. The RFID tag identification device 109 may also be configured to receive data from the remote computing device in response to sending information from the RFID tag of the item 103. Moreover, the network transmission circuitry 121 of the RFID tag identification device 109 may be used to triangulate the position of the RFID tag identification device 109 in those embodiments that lack a GPS unit 119 or similar circuitry or when GPS signals or similar signals are unavailable.

The RFID tag identification device 109 may be positioned in various locations on the picker 100. For example, the RFID tag identification device 109 may be positioned on the picker 100 in a manner to minimize or avoid any electromagnetic shadow or other interference created by the arm of the picker 100 with respect to an item 103 being retrieved by the picker 100. Objects located between a transmitter and a receiver of a radio wave can create interference or shadow effects. In order to maximize the accuracy of a signal strength measured by the signal strength reader 116 within the RFID tag identification device 109, the RFID tag identification device 109 may be positioned in order to avoid the picker 100 inadvertently placing an arm or other appendage between the RFID tag identification device 109 and the item 103 being retrieved.

Figure 1B:
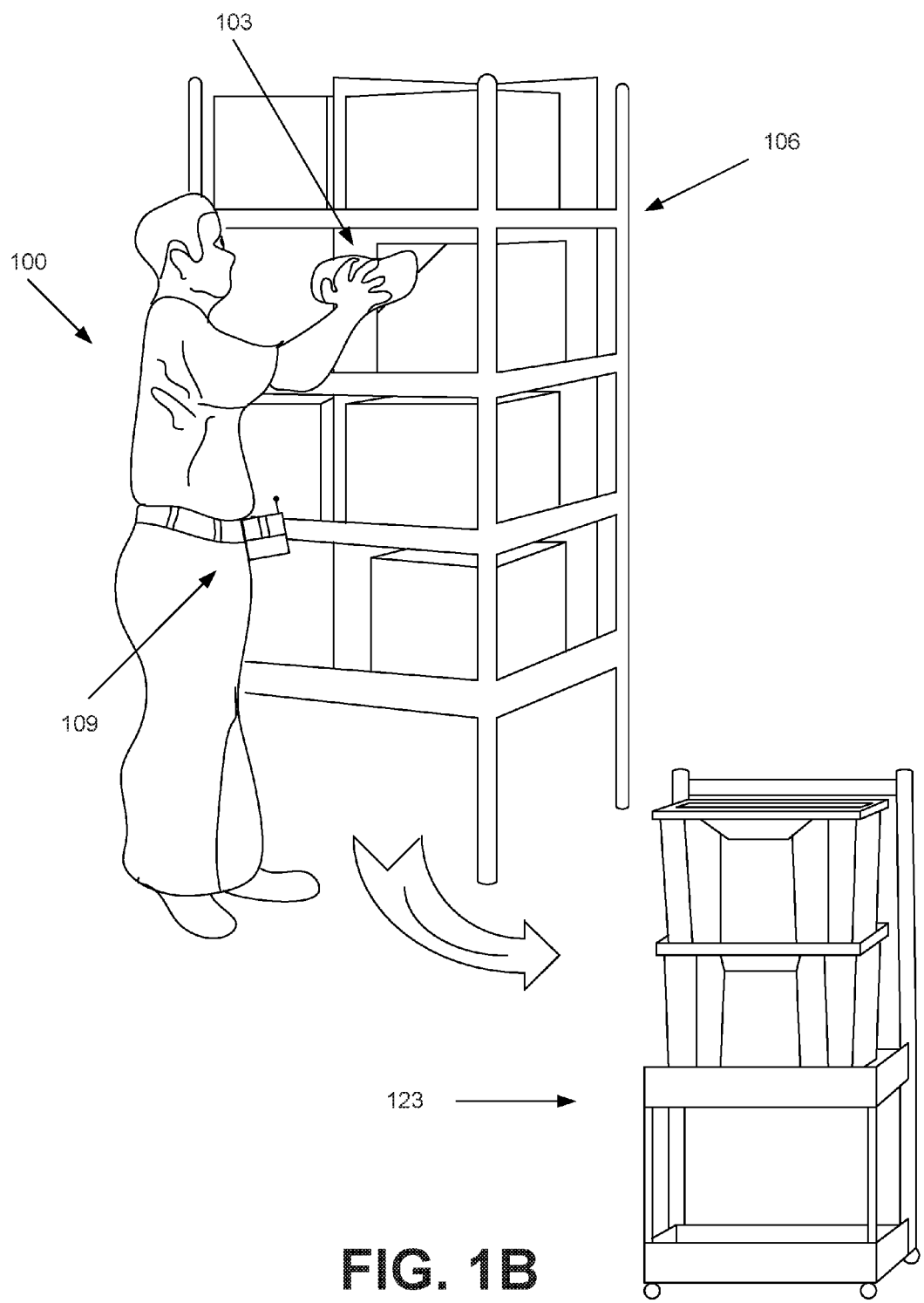
FIG. 1B is a drawing depicting the motion of a picker retrieving an item from a storage location.

Proceeding to FIG. 1B, depicted is an example of a type of motion that may be identified using the RFID tag identification device 109. Although the RFID tag identification device 109 is depicted as being attached to the picker 100, other positions and locations for the RFID tag identification device 109 are possible, including stationary and/or stand along RFID tag identification devices 109. Here, the picker 100 is moving an item 103 from an item storage structure 106 to a cart 123. As previously discussed above and discussed in further detail herein, the illustrated trajectory of the motion of the item 103 from the item storage structure 106 to the cart 123 may detected and/or identified based at least in part one or more of changes in signal strength broadcast by an RFID tag attached to the item 103 as it moves relative to the RFID tag identification device 109 and/or motion data detected by a sensor in the RFID tag attached to the item 103 and transmitted or broadcast to the RFID tag identification device 109.

Figure 2A:
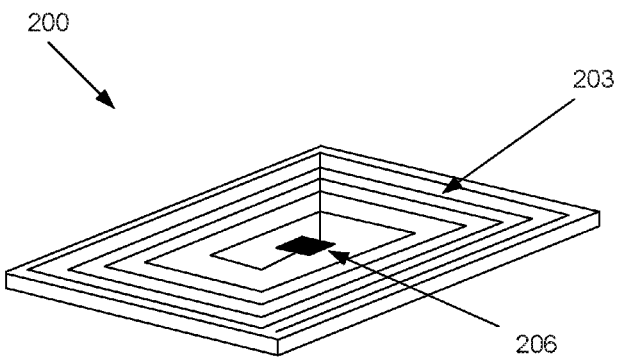
FIG. 2A is a drawing of a radio frequency identification (RFID) tag according to various embodiments of the present disclosure.

Moving on to FIG. 2A, shown is an example of an RFID tag 200, which may be used in conjunction with the RFID tag identification device 109 according to various embodiments of the present disclosure. The RFID tag 200 may include a number of components, such as an antenna 203, a microchip 206, and other circuitry. Active RFID tags 200 may also include a battery to provide electrical power to the microchip 206 or to energize the antenna 203 for transmission. Passive RFID tags 200 do not include a battery and instead rely upon receiving an electromagnetic signal via the antenna 203 to remotely energize the passive RFID tags 200 for operation. In some embodiments, an RFID tag 200 may also include multiple microchips 206 and/or multiple antennas 203 to permit additional or advanced operations or to permit transmission and reception of radio signals on multiple frequencies. Although depicted as a flat, rectangular structure, RFID tags 200 may be constructed in any number of shapes or forms, depending on the particular application. For example, RFID tags 200 may be constructed in the form of a capsule, badge, or other form.

Figure 2B:
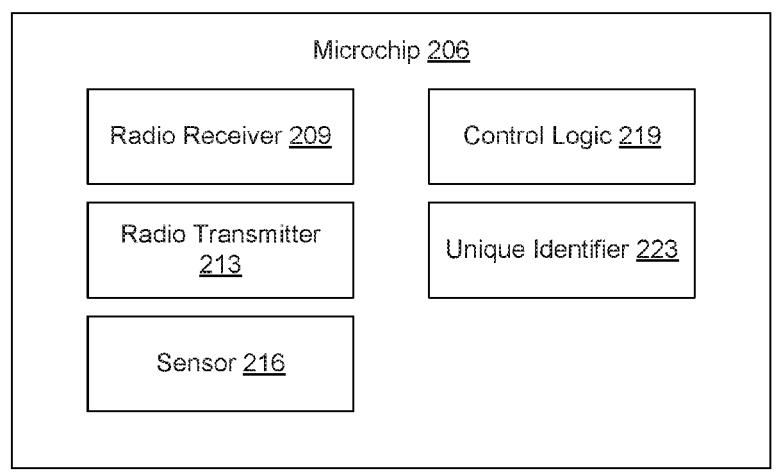
FIG. 2B is a schematic block diagram of an integrated circuit included in the RFID tag of FIG. 2A according to various embodiments of the present disclosure.

FIG. 2B depicts a schematic block diagram of an embodiment of a microchip 206 that may be found in an RFID tag 200. The microchip 206 may include, for example, a radio receiver 209, a radio transmitter 213, a sensor 216, control logic 219, and/or other circuitry. The microchip 206 may also store a unique identifier 223 of the RFID tag 200, as well as other data.

The radio receiver 209 may, for example, convert an energizing electromagnetic signal into an electric charge suitable for use by the microchip 206. The radio receiver 209 may also, for example, decode radio transmissions for processing by the control logic 219 or other circuitry. In such embodiments, the radio receiver 209 may include a front end receiver and baseband processor, among other related circuitry.

The radio transmitter 213 may, for example, transmit information pursuant to instructions received from the control logic 219. For example, the radio transmitter may convert a unique identifier 223 into an appropriate radio transmission for broadcast pursuant to instructions received from the control logic 219. In some embodiments, the radio transmitter 213 may correspond to a modem, baseband processor, or similar circuitry. In some embodiments, the radio transmitter 213 may also be configured to transmit, broadcast, and/or otherwise operate on a different frequency than the radio receiver 209 in order to minimize interference between the electromagnetic signal received from the RFID reader 113 (FIG. 1A) and the electromagnetic signal emitted by the radio transmitter 213.

In some embodiments, the microchip 206 of the RFID tag 200 may include a sensor 216. For example, the sensor 216 may include one or more accelerometers, velocimeters, and/or other motion sensors. In such embodiments, the RFID tag 200 may detect whether it is accelerating as well as the direction of acceleration (e.g., along the X-axis, Y-axis, or Z-axis) and the magnitude of acceleration. In some embodiments, the magnitude of acceleration along each axis of movement may also be detected and/or recorded. In various embodiments, RFID tag 200 may detect the velocity (speed and direction) instead or in addition to the acceleration of the RFID tag 200. Due to the generally small size of RFID tags 200, one or more microelectromechanical systems (MEMS) sensors may be used. In certain embodiments, alternatively or in addition to MEMS accelerometers, one or more MEMS gyroscopes may be used.

Control logic 219 may be included in the microchip 206 of RFID tags 200 in order to provide RFID tags 200 with additional functionality. For example, the control logic 219 may allow for an RFID tag 200 to selectively broadcast. As an illustrative and non-limiting example, a passive RFID tag 200 may have control logic 219, such as an electrical switch and/or a series of firmware instructions, configured to direct the RFID tag 200 to only broadcast in response to receiving an energizing electromagnetic transmission if the sensor 216 detects that the RFID tag 200 is accelerating, for example due to an item 103 (FIG. 1A) to which the RFID tag 200 is attached being retrieved by a picker 100 (FIG. 1A).

Each RFID tag 200 may include a corresponding unique identifier 223. The unique identifier 223 allows for a one-to-one correspondence to be created between an RFID tag 200 and an associated item 103 (FIG. 1A). In such embodiments, the unique identifier 223 may be globally unique, such as a serial number of the RFID tag 200, or may correspond to a stock keeping unit (SKU) number for the item 103, a universal product code (UPC) number for the item 103, or other identifier of a type of item 103. The unique identifier 223 may be used to facilitate tracking of items 103 within a fulfillment center, as will be further described herein.

Figure 3:
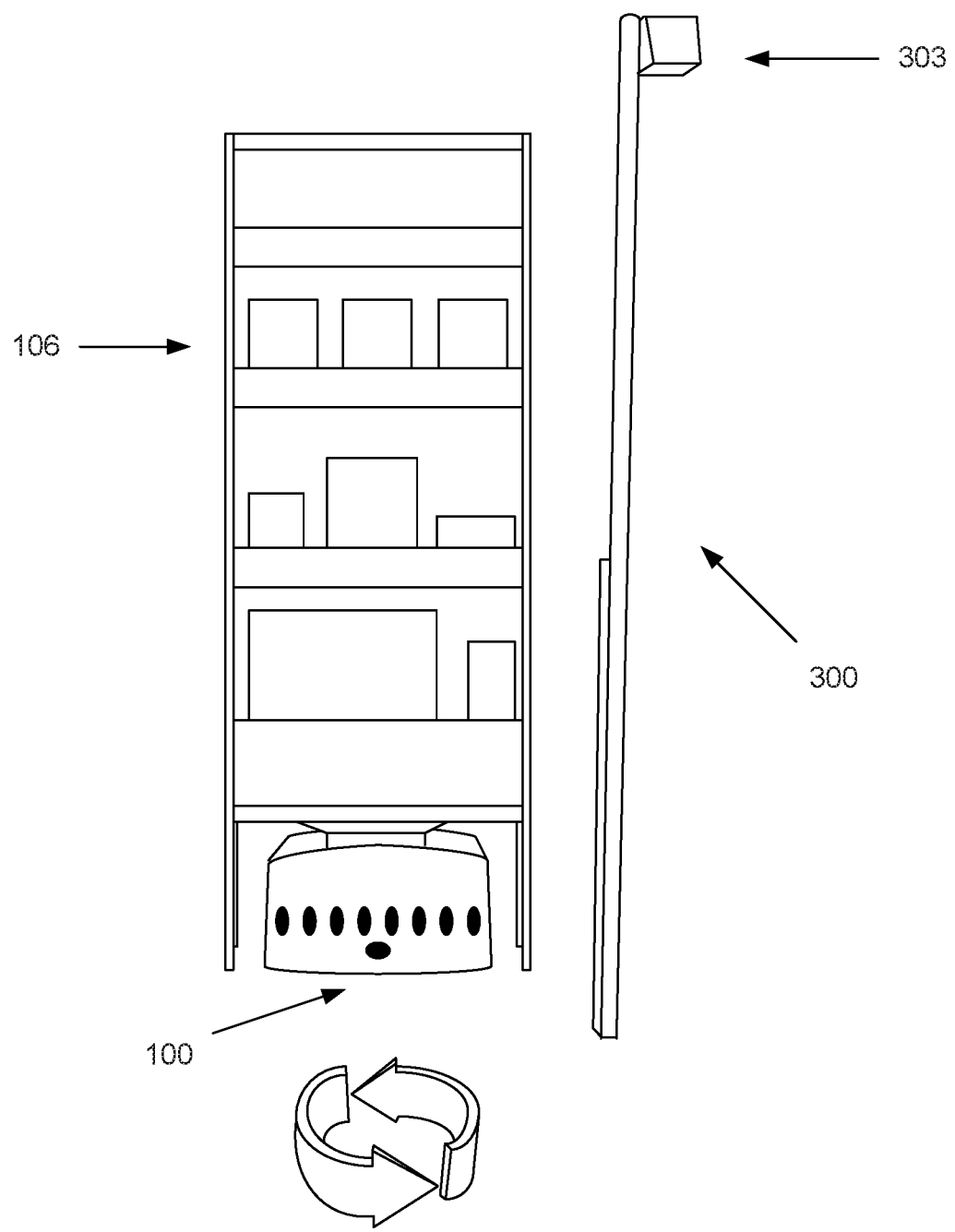
FIG. 3 is a drawing of a robotic picker verifying inventory at an item storage location in a fulfillment center according to various embodiments of the present disclosure.

With reference to FIG. 3, shown is another embodiment in which RFID tags 200 (FIG. 2A) may be used to verify that items 103 (FIG. 1A) have been retrieved by a picker 100. In embodiments such as those depicted in FIG. 3, a picker 100, such as an autonomous robot, moves an item storage structure 106 to an RFID reader station 300 within a fulfillment center. However, in some embodiments, the role of the RFID reader station 300 may be fulfilled by the RFID tag identification device 109 (FIG. 1A) previously described. An RFID reader 303 then reads the unique identifiers 223 (FIG. 2B) of each RFID tag 200 (FIG. 2A) attached to items 103 in the item storage structure 106. The RFID reader station 300 may then send a list of the unique identifiers 223 of RFID tags 200 that responded to the RFID reader 303 to remote computing device. The remote computing device can then determine whether any items 103 are missing from the item storage structure 106 or whether any items 103 are within the item storage structure 106 that should not be present. For example, pickers 100 may retrieve the wrong item 103 from an item storage structure 106 when fulfilling an order, resulting in a mismatch between the items 103 that are expected to be present in the item storage structure 106 and the items 103 that the RFID reader 303 detects as actually present in the item storage structure 106.

In some embodiments, the picker 100 may rotate the item storage location 106 to facilitate reading of the unique identifiers 223 (FIG. 3) of each RFID tag 200 by the RFID reader 303. Rotation of the item storage structure 106 relative to the RFID reader 303 may increase the number of RFID tags 200 which have their antennas 203 optimally aligned, during at least a portion of the rotation, to receive the radio waves broadcast from the RFID reader 303. As the item storage structure 106 is rotated, RFID tags 200 which were not originally optimally aligned with respect to the RFID reader 303 for radio reception/transmission purposes may become optimally aligned during at least a portion of the rotation. This increases the number of RFID tags 200 which may be queried by the RFID reader 303. In some embodiments, the picker 100 may rotate the item storage structure 106 at various speeds, shake the item storage structure 106, or otherwise manipulate the item storage structure 106 to jostle RFID tags 200 into an optimal position to further increase the number of RFID tags 200 which may be queried. By increasing the number of RFID tags 200 placed in an optimal position for radio communication with the RFID reader 303, the accuracy of identifying inventory within the item storage structure 106 may be increased.

Figure 4:
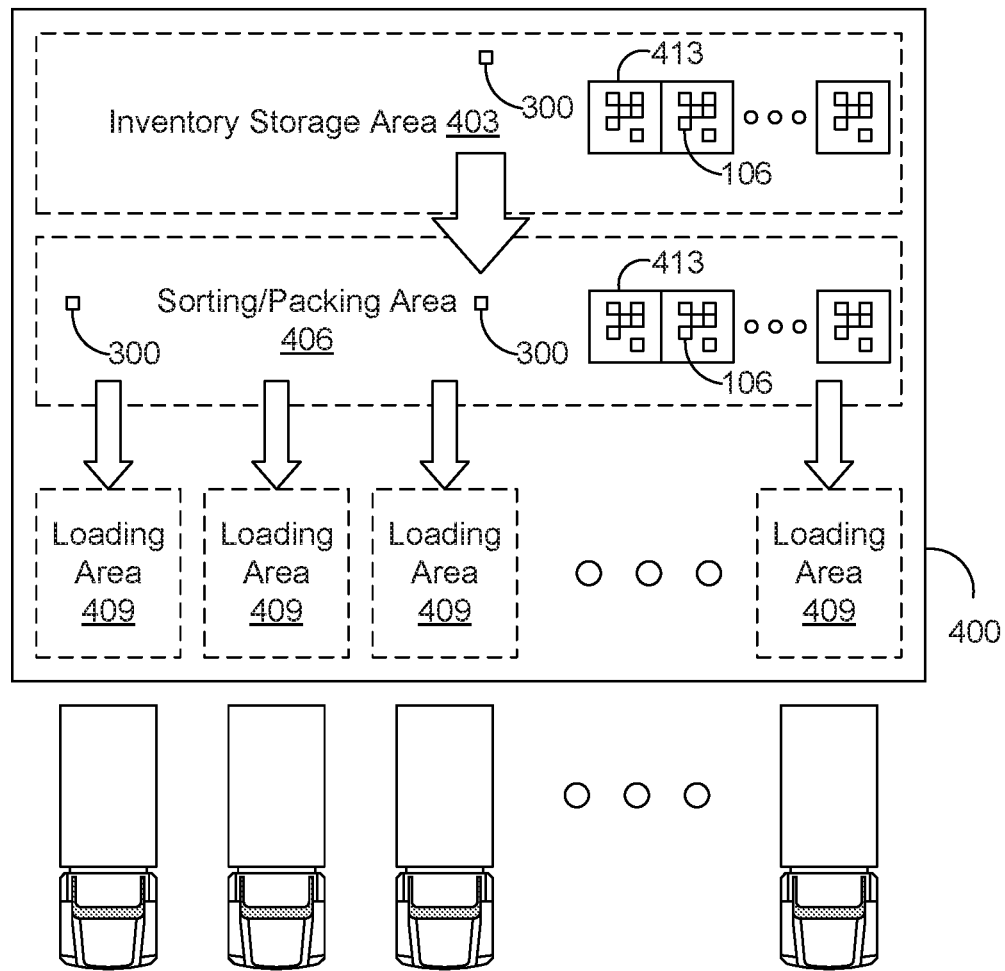
FIG. 4 is a drawing of a fulfillment center according to various embodiments of the present disclosure.

Moving on to FIG. 4, shown is a pictorial diagram of a fulfillment center 400. A fulfillment center 400 is any materials handling facility where orders for items are fulfilled and/or shipments of items corresponding to orders originate. As such, a fulfillment center may, for example, correspond to a warehouse, a distribution center, a processing center, or a similar structure. In some embodiments, a fulfillment center 400 may be divided into multiple sections. For example, a fulfillment center 400 may include one or more inventory storage areas 403, one or more sorting/packing areas 406, and one or more loading areas 409 where shipments are loaded onto delivery vehicles for delivery to customers pursuant to orders for such items or other recipients such as other materials handling facilities. The fulfillment center 400 may also have one or more mechanisms or methods for moving items between sections, including conveyors, forklifts, robotic handling equipment, and other means. In addition, a fulfillment center 400 may have one or more pickers 100 (FIGS. 1 and 3) or other employees who traverse pick routes or other paths generated by a shipment or order fulfillment system or process in order to retrieve items within the fulfillment center 400 for shipment. However, in some embodiments, a picker 100 may have items 103 delivered to the picker 100, such as when robotic handling equipment or other devices move a shelving unit or other item storage structure 106 (FIG. 1A) to a location near the picker 100. Further, there may be one or more RFID reader stations 300 located throughout the inventory storage area 403 and/or the sorting/packing area 406.

The inventory storage area 403 includes one or more item locations 413 where one or more items 103 (FIG. 1A) may be located for short-term, long-term, piecewise or bulk storage in an item storage structure 106 (FIG. 1A). An item storage structure 106 may correspond to any number of physical structures located at an item location 413. For example, a shelf, set of shelves, a pallet on a floor, a bin and/or a series of bins, or similar structures may be considered to be an item storage structure 106 at an item location 413.

Items 103 include physical goods available for order and shipment from the fulfillment center 400. Items 103 may include, for example, books, compact discs (CDs), digital video discs (DVDs), televisions, cameras, stereo systems, computers, pots, pans, appliances, exercise equipment, power tools, garden tools, furniture, toys, clothes, cosmetics, medicine, medical supplies, jewelry, sporting goods and/or equipment, meat, fruit, vegetables, canned goods, dairy products, and/or other goods or products.

There is no requirement that identical items 103 be stored together at the same or neighboring item locations 413. In some embodiments, it may be more efficient to organize the inventory storage area 403 such that identical or similar items 103 are stored together. For example, all DVDs may be stored in a group or cluster of adjacent item locations 413, with all DVDs corresponding to a particular movie located in a single item location 413. In other embodiments, it may be more efficient to store an item 103 in any item location 413 with sufficient capacity. In such embodiments, multiple instances of the same item 103 may be stored in separate item locations 413 at various locations, e.g., on opposite sides, of the inventory storage area 403. For example, DVDs corresponding to a particular movie may be located in multiple item locations 413 spread through the inventory storage area 403 for more efficient accessibility in certain situations or scenarios.

The sorting/packing area 406 is where items 103 are sorted and packed for shipment. Within a sorting/packing area 406, items 103 may be located at item locations 413 according to various embodiments of the present disclosure. Items 103 at item locations 413 within the sorting/packing area 406 may be located such that pickers may be able to quickly and efficiently retrieve items 103 for fulfillment or shipments. Generally, as items 103 within the item locations 413 of the sorting/packing area 406 are used to fulfill orders, items 103 at item locations 413 within the inventory storage area 403 may be automatically moved from the inventory storage area 403 to the sorting/packing area 406. The automated movement of items from the inventory storage area 403 to the sorting/packing area 406 may be directed by automated systems or processes that track inventory levels at item locations 413 within the sorting/packing area 406 and dispatch employees or automatons to transfer goods from the item locations 413 within the inventory storage area 403 to the item locations 413 within the sorting/packing area 406.

As orders for particular items 103 are received, one or more pickers 100 (FIGS. 1 and 3) may be dispatched to retrieve one or more items 103 from item locations 413 within the sorting/packing area 406. A single picker 100 may retrieve multiple items 103 of an order and one or more pickers 100 may be assigned to pick items 103 of the order. If items 103 are not at item locations 413 within the sorting/packing area 406, or an insufficient quantity of items 103 are located within the sorting/packing area 406, then the pickers 100 may be dispatched to the inventory storage area 403 to retrieve the items 103 and deliver them to the sorting/packing area 406. In some embodiments, pickers 100 may be designated employees at the fulfillment center 400 who retrieve items 103. In other embodiments, pickers 100 may be machines, such as robots or other automatons that retrieve items 103 from the inventory storage area 403.

Pickers 100 generally follow designated pick routes, which are generated to minimize the time and distance necessary for the picker 100 to travel to retrieve the requested items 103 from the item locations 413 within the sorting/packing area 406 or the inventory storage area 403. For a given pick route, a picker 100 may retrieve one or more items 103 corresponding to one or more orders. The items 103 retrieved may be a number of different items 103 corresponding to one or more orders or the items 103 may be one or more of the same item 103 corresponding to one or more orders, depending on the requirements behind planning the pick route.

Figure 5:
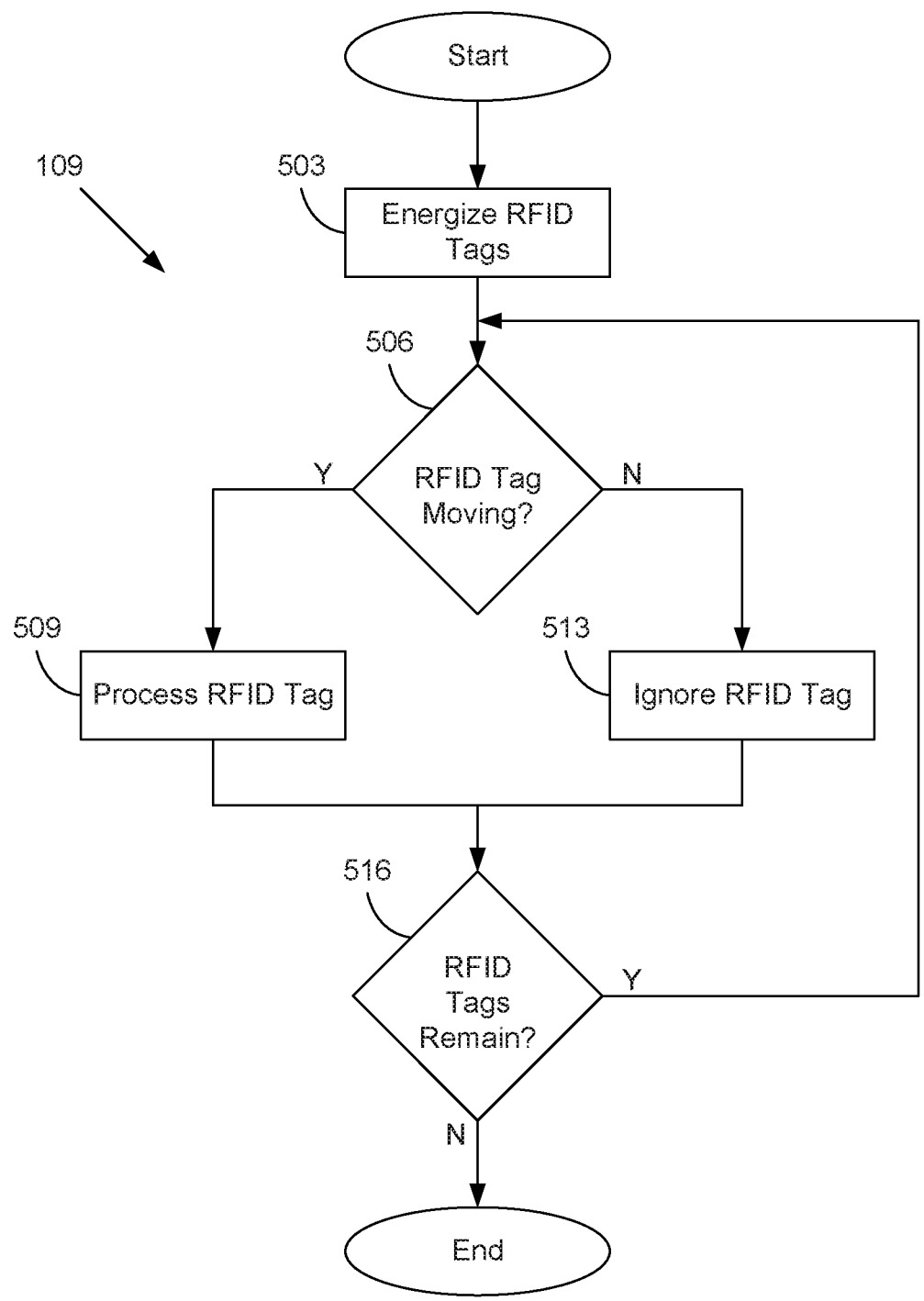
FIG. 5 is a flowchart illustrating one example of functionality implemented as portions of the RFID tag identification device of FIG. 1A according to various embodiments of the present disclosure.

Referring next to FIG. 5, shown is a flowchart that provides one example of the operation of a portion of the RFID tag identification device 109 according to various embodiments. It is understood that the flowchart of FIG. 5 provides merely an example of the many different types of functional arrangements that may be employed to implement the operation of the portion of the RFID tag identification device 109 as described herein. As an alternative, the flowchart of FIG. 5 may be viewed as depicting an example of elements of a method implemented in the RFID tag identification device 109 according to one or more embodiments. Further, it is understood that some portions of the functionality depicted in FIG. 5 may be implemented on a remote computing device, such as a server, in those embodiments where additional computational capabilities are desired.

Beginning at box 503, the RFID tag identification device 109 emits a radio wave from the RFID reader 113 (FIG. 1A). The radio wave emitted by the RFID reader 113 energizes passive RFID tags 200 (FIG. 2A) within a radius of the RFID reader 113 determined by the strength of the radio wave. In response to being energized by the radio wave, one or more of the RFID tags 200 may broadcast a response. In various embodiments, the strength of the radio wave emitted by the RFID reader 113, and therefore the operational radius of the RFID reader 113, may be adjustable. For example, a setting on the RFID tag identification device 109 may allow the strength of the emitted radio wave to be changed.

Proceeding to box 506, the RFID tag identification device 109 determines whether one of the RFID tags 200 from which a signal is received is moving. The RFID tag identification device 109 may determine whether the RFID tag 200, and by extension an item 103 (FIG. 1A) to which the RFID tag 200 is attached, is moving using a number of approaches.

For example, the RFID tag 200 may include a sensor 216 (FIG. 2B), such as an accelerometer, a MEMS gyroscope, or other motion detecting sensor. In such embodiments, the RFID tag 200 may transmit motion information, such as a velocity and/or acceleration of the RFID tag 200 or other motion information. The RFID tag identification device 109 may then use the transmitted motion information to determine if the RFID tag 200 is in motion. For example, if the RFID tag 200 reports a velocity or an acceleration with a non-zero value, then the RFID tag identification device 109 may determine that the RFID tag 200 is in motion.

However, in some embodiments related to this example, the RFID tag 200 may be configured to respond, when energized by an RFID reader such as the RFID reader 113 (FIG. 1A) of the RFID tag identification device 109, only if the sensor 216 detects a non-zero value for the velocity and/or the acceleration of the RFID tag 200. In these or similar embodiments, configuring an RFID tag 200 to broadcast only if the sensor 216 detects that the RFID tag 200 is moving limits the number of RFID tags 200 transmitting in response to being energized by the RFID reader 113. In such embodiments, step 506 may be unnecessary because only moving RFID tags 200 are broadcasting in response to being energized in step 503.

Moving on to box 509, if the RFID tag 200 is moving, the RFID tag identification device 109 processes the RFID tag 200. Processing the motion data reported by the RFID tag 200 may include, for example, comparing the unique identifier 223 of the item 103 attached to the RFID tag 200 with a unique identifier 223 of an item 103 which a picker 100 is supposed to be retrieving from an item storage structure 106 to determine whether the picker 100 has retrieved the correct item 103. In some embodiments, processing may also include determining whether the motion data of the RFID tag 200 matches expected motion data for an item 103 which a picker 100 is supposed to retrieve from an item storage structure 106, as described in more detail with respect to FIG. 7.

Referring to box 513, if the RFID tag 200 is not moving, the RFID tag identification device 109 marks the RFID tag 200 as having been processed and excludes the RFID tag 200 from further processing. Because multiple RFID tags 200 may have been energized at box 503 and transmitted a response, ignoring and/or excluding RFID tags 200 from further processing that do not report movement data allows the RFID tag identification device 109 to isolate individual RFID tags 200 having associated movement.

Proceeding to box 516, the RFID tag identification device 109 determines whether any additional energized RFID tags 200 within range have broadcast a response but have not yet been processed. If additional RFID tags 200 remain to be processed, then execution loops back to box 506 and the RFID tag identification device 109 processes the next RFID tag 200. If there are no additional RFID tags 200 to be processed, then execution ends.

Figure 6:
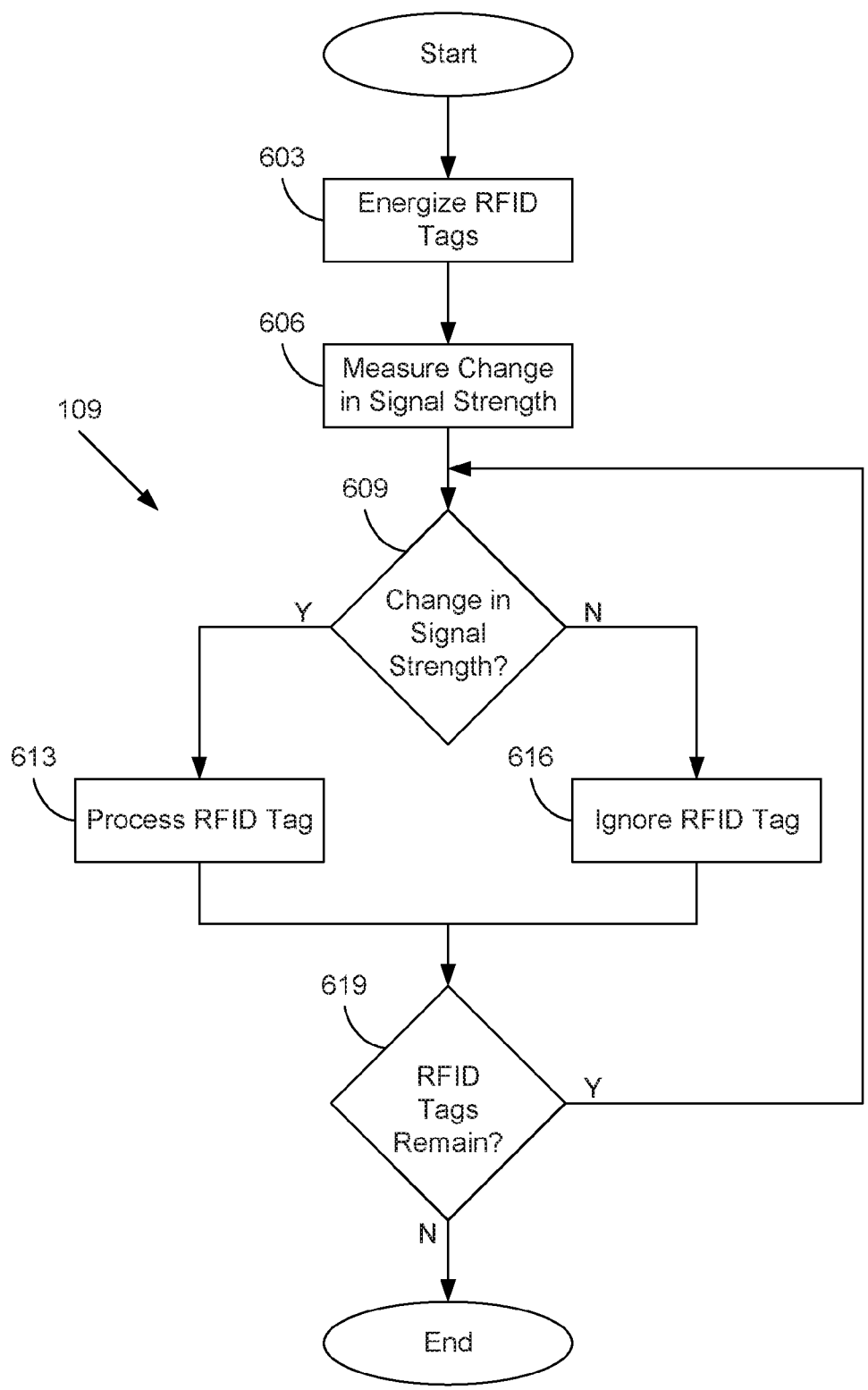
FIG. 6 is a flowchart illustrating one example of functionality implemented as portions of the RFID tag identification device of FIG. 1A according to various embodiments of the present disclosure.

Referring next to FIG. 6, shown is a flowchart that provides one example of the operation of a portion of the RFID tag identification device 109 according to various embodiments. It is understood that the flowchart of FIG. 6 provides merely an example of the many different types of functional arrangements that may be employed to implement the operation of the portion of the RFID tag identification device 109 as described herein. As an alternative, the flowchart of FIG. 6 may be viewed as depicting an example of elements of a method implemented in the RFID tag identification device 109 according to one or more embodiments. Further, it is understood that some portions of the functionality depicted in FIG. 6 may be implemented on a remote computing device, such as a server, in those embodiments where additional computational capabilities are desired.

Beginning at box 603, the RFID tag identification device 109 emits a radio wave from the RFID reader 113 (FIG. 1A). The radio wave emitted by the RFID reader 113 energizes passive RFID tags 200 (FIG. 2A) within a radius of the RFID reader 113 determined by the strength of the radio wave. In response to being energized by the radio wave, one or more of the RFID tags 200 may broadcast a response. In various embodiments, the strength of the radio wave emitted by the RFID reader 113, and therefore the operational radius of the RFID reader 113, may be adjustable. For example, a setting on the RFID tag identification device 109 may allow the strength of the emitted radio wave to be changed.

Proceeding next to box 606, the RFID tag identification device 109 may use a signal strength meter 116 to identify RFID tags 200 that are in motion, based upon measured changes in the signal strength of the responses of individual RFID tags 200 over an interval or period of time. For example, an RFID tag 200 may broadcast its unique identifier 223 several times over the course of a second. The signal strength meter 116 may be used to determine whether there was a change in the signal strength of each broadcast, as well as the magnitude of such a change between each broadcast.

Moving on to box 609, the RFID tag identification device 109 may determine whether a change in the signal strength of a broadcast by an RFID tag 200 occurred. The determination may be based on a single comparison between two broadcasts by the RFID tag 200 at two points in time. However, in some embodiments, the determination may be based on a series of measurements of signal strengths corresponding to multiple broadcasts by the RFID tag 200 over a period of time. For example, to account for environmental factors, RFID tag identification device 109 may use the slope or the value of derivative function of a trend line, trend curve, and/or similar graph, representing the series of measurements of signal strengths of the broadcasts of the RFID tag 200 to determine whether a change in the signal strength occurred and whether the signal strength was increasing or decreasing over time.

Referring next to box 613, if a change in the signal strength of the broadcast by the RFID tag 200 has occurred, the RFID tag identification device 109 processes the RFID tag 200. Processing the RFID tag 200 may include, for example, determining the type of motion associated with the RFID tag 200 and taking an appropriate course of action. For example, the RFID tag identification device 109 may determine that the RFID tag 200 is moving towards the RFID tag identification device 109 based at least in part on identifying an increase in the signal strength broadcast by the RFID tag 200. The RFID tag identification device 109 may therefore conclude that because the RFID tag 200 is moving towards the RFID tag identification device 109, an item 103 (FIG. 1A) attached to the RFID tag 200 has been retrieved by a picker 100 (FIG. 1A). Accordingly, the RFID tag identification device 109 may compare the unique identifier 223 (FIG. 2B) of the item 103 attached to the RFID tag 200 with a unique identifier 223 of an item 103 which a picker 100 is supposed to be retrieving from an item storage structure 106 to determine whether the picker 100 has retrieved the correct item 103. In some embodiments, processing may also include determining whether the change in the signal strength of the RFID tag 200 matches an expected change in the signal strength for an item 103 which a picker 100 is supposed to retrieve from an item storage structure 106, as described in more detail with respect to FIG. 7.

However, with respect to box 616, if a change in the signal strength of the broadcast by the RFID tag 200 has not occurred, the RFID tag identification device 109 marks the RFID tag 200 as having been processed and excludes the RFID tag 200 from further processing. Because multiple RFID tags 200 may have been energized at box 603 and transmitted a response, ignoring and/or excluding RFID tags 200 from further processing that are not moving, as indicated by a lack of a change in signal strength detected by the signal strength meter 116, allows the RFID tag identification device 109 to isolate individual RFID tags 200 having associated movement.

Proceeding to box 619, the RFID tag identification device 109 determines whether any additional energized RFID tags 200 within range have broadcast a response but have not yet been processed. If additional RFID tags 200 remain to be processed, then execution loops back to box 609 and the RFID tag identification device 109 determines whether the next RFID tag 200 showed changes in the broadcast signal strength. If there are no additional RFID tags 200 to be processed, then execution ends.

It should be noted that the approaches depicted in the flowcharts of FIGS. 5 and 6 are not mutually exclusive. In some embodiments, data from a sensor 216 and a signal strength meter 116 may be used in conjunction. For example, use of the approach depicted in FIG. 5 in combination with the approach depicted in FIG. 6 may result in greater accuracy in comparison to using either approach individually.

Figure 7:
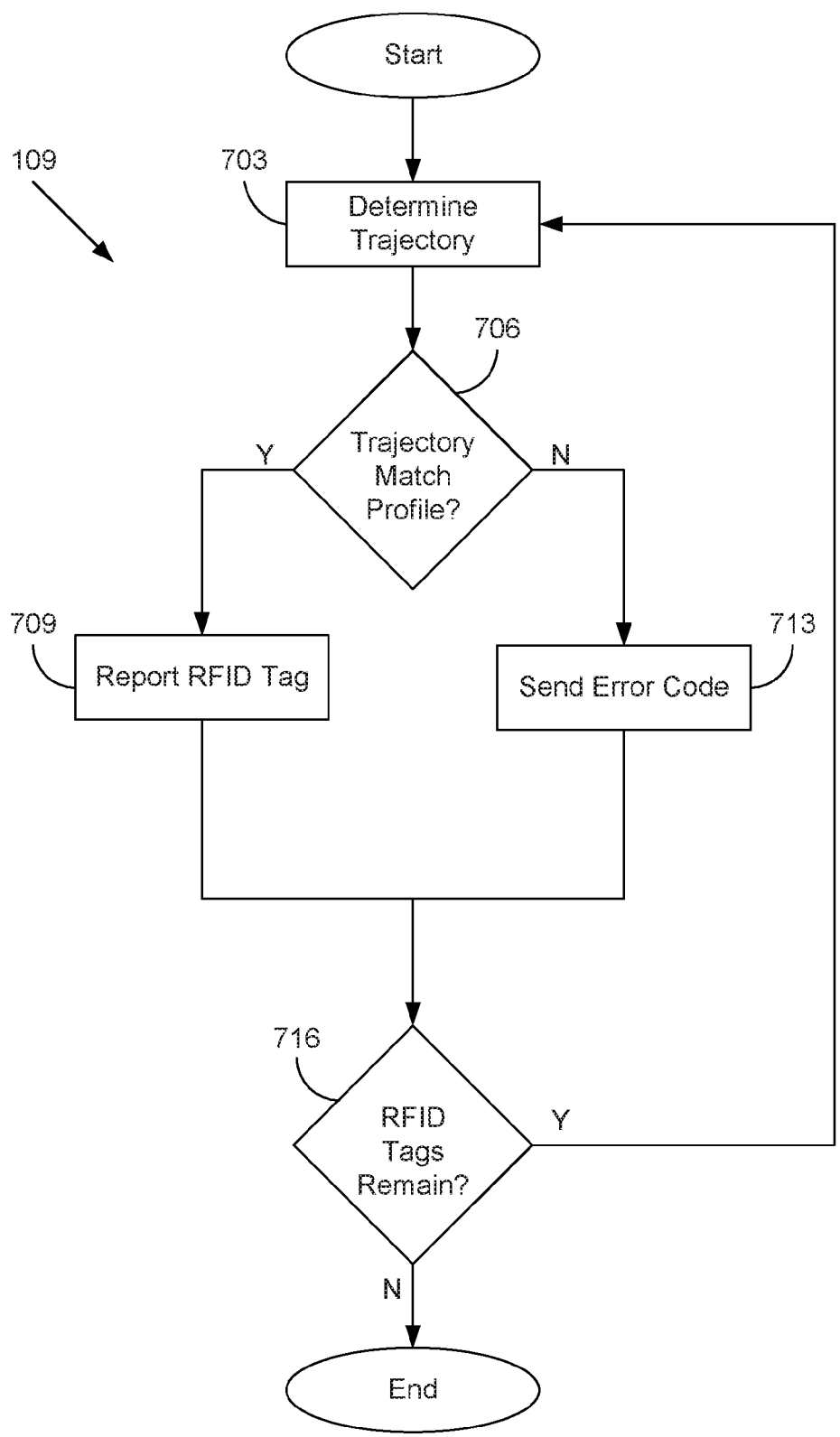
FIG. 7 is a flowchart illustrating one example of functionality implemented as portions of the RFID tag identification device of FIG. 1A or, in some embodiments, the RFID reader station depicted in FIG. 3 according to various embodiments of the present disclosure.

Referring next to FIG. 7, shown is a flowchart that provides one example of the operation of a portion of the RFID tag identification device 109 according to various embodiments. It is understood that the flowchart of FIG. 7 provides merely an example of the many different types of functional arrangements that may be employed to implement the operation of the portion of the RFID tag identification device 109 as described herein. As an alternative, the flowchart of FIG. 7 may be viewed as depicting an example of elements of a method implemented in the RFID tag identification device 109 according to one or more embodiments. Moreover, the functionality or method depicted in FIG. 7 may also, in some embodiments, be implemented by various RFID reader stations 300 (FIG. 3) located throughout a fulfillment center 400 (FIG. 4) in order to monitor items 103 (FIG. 1A) within the fulfillment center 400.

Beginning with box 703, the RFID tag identification device 109 determines a trajectory of an energized RFID tag 200 (FIG. 2A). Because an RFID reader, such as the RFID reader 113 (FIG. 1A) of a RFID tag identification device 109, may energize multiple RFID tags 200 within the broadcast range of the RFID reader 113, the RFID tag identification device 109 may use one or more techniques to determine a trajectory of individual RFID tags 200 in order to filter extraneous responses. Some embodiments may make use of information transmitted from a sensor 216 of an RFID tag 200, such as those embodiments previously described in FIG. 5. Other embodiments may make use of a signal strength meter 116 (FIG. 1A) of the RFID tag identification device 109, such as those embodiments previously described in FIG. 6. In some embodiments, a combination of approaches may be used.

Proceeding to box 706, the RFID tag identification device 109 determines whether the trajectory determined in box 703 matches a previously defined trajectory profile. Different trajectory profiles may define different scenarios related to the movement of an RFID tag 200. For example, a trajectory profile may include an expected trajectory corresponding to one or more of a number of various scenarios. The expected trajectory may represent an expected speed, direction of motion, duration of movement, series and/or sequence of positions, and other such data. The expected trajectory may also represent an expected series and/or sequence of signal strengths to be measured by the signal strength reader 116 (FIG. 1A). By matching data related to the motion of a particular RFID tag 200 to a previously defined trajectory profile, the RFID tag identification device 109 can determine what is happening to the particular RFID tag 200. If the determined trajectory matches a previously defined trajectory profile, execution proceeds to box 709. If the determined trajectory does not match a previously defined trajectory profile, then execution instead proceeds to box 713.

For example, the direction in which a picker 100 moves an item 103 from an item storage structure 106 (FIG. 1A) and the speed at which such an item 103 moves, or a corresponding sequence of signal strength measurements, may be previously known from previous measurements or other sources. This data may be stored in a trajectory profile. If the RFID tag identification device 109 determines that an RFID tag 200 associated with an item 103 is moving at the same speed and in the same direction as those indicated in a trajectory profile matching that of a picker 100 retrieving an item 103 from an item storage structure 106, or that the sequence of signal strength measurements matches the sequence of signal strength measurements anticipated from a picker 100 retrieving an item 103 from an item storage structure 106, then the RFID tag identification device 109 may determine that the picker has retrieved an item 103 from the item storage structure 106. As previously described, execution would then proceed to box 709 in such a scenario.

As another example, if the RFID tag identification device 109 determines that an RFID tag 200 associated with an item 103 in the item storage structure 106 is accelerating and moving towards the ground, the RFID tag identification device 109 may determine that the RFID tag 200 has fallen off of the item 103 or that the item 103 itself has fallen from the item storage structure 103. If the detected fall occurs at the same time as the picker 100 is attempting to retrieve the item from the item storage structure 106, the RFID tag identification device 109 may further determine that either the item 103 was dropped by the picker 100 or that the item 103 dislodged from the item storage structure 106, depending upon which trajectory profile better matches the data. As previously described, execution would then proceed to box 709 in such a scenario.

Proceeding to box 709, the RFID tag identification device 109 reports the RFID tag 200 to a remote computing device, such as a server, based on the type of trajectory profile that the RFID tag 200 was determined to have matched in box 706. For example, if the trajectory of the RFID tag 200 is determined to have matched the trajectory of a picker 100 retrieving an item 103 from an item storage structure 106, then the RFID tag identification device 109 may report that the item 103 corresponding to the RFID tag 100 has been picked. As another example, if the trajectory of the RFID tag 200 is determined to have matched the trajectory of an item 103 falling from the item storage structure 106, such as an item 103 falling off of a shelf, then the RFID tag identification device 109 may report the fallen item 103 to an appropriate system, application, or individual. As yet another example, the RFID tag identification device 109 may determine that the trajectory or sequence of signal strength readings indicates that an item 103 is moving outside of the fulfillment center 400 and report the item 103 as being potentially stolen. As further illustrative example, the RFID tag identification device 109 may determine that the motion data, trajectory, or series of signal strength readings matches motions, trajectories, or signal strength measurements corresponding to various aspects of order fulfillment, such as sorting or packing items 103 for shipment, loading items 103 onto delivery vehicles for shipment, and/or other activities.

Referring to box 713, if the determined trajectory does not match a previously defined trajectory profile, the RFID tag identification device 109 sends an error code, exception, or similar message to a remote computing device. For example, the RFID tag identification device 109 may, in some embodiments, send an error message to a remote computing device or remotely executing application. The message may contain, for example, the motion data measured by the signal strength meter 116 or the motion data reported by the RFID tag 200, as well as an indication that the motion data does not match a known trajectory profile. Execution would then proceed to box 716.

Moving on to box 716, the RFID tag identification device 109 determines whether additional RFID tags 200 remain to be processed. If additional RFID tags 200 remain to be processed, execution loops back to box 703 and the trajectory of the next RFID tag 200 to be analyzed is determined. If no additional RFID tags 200 remain to be processed, then execution ends.

Figure 8:
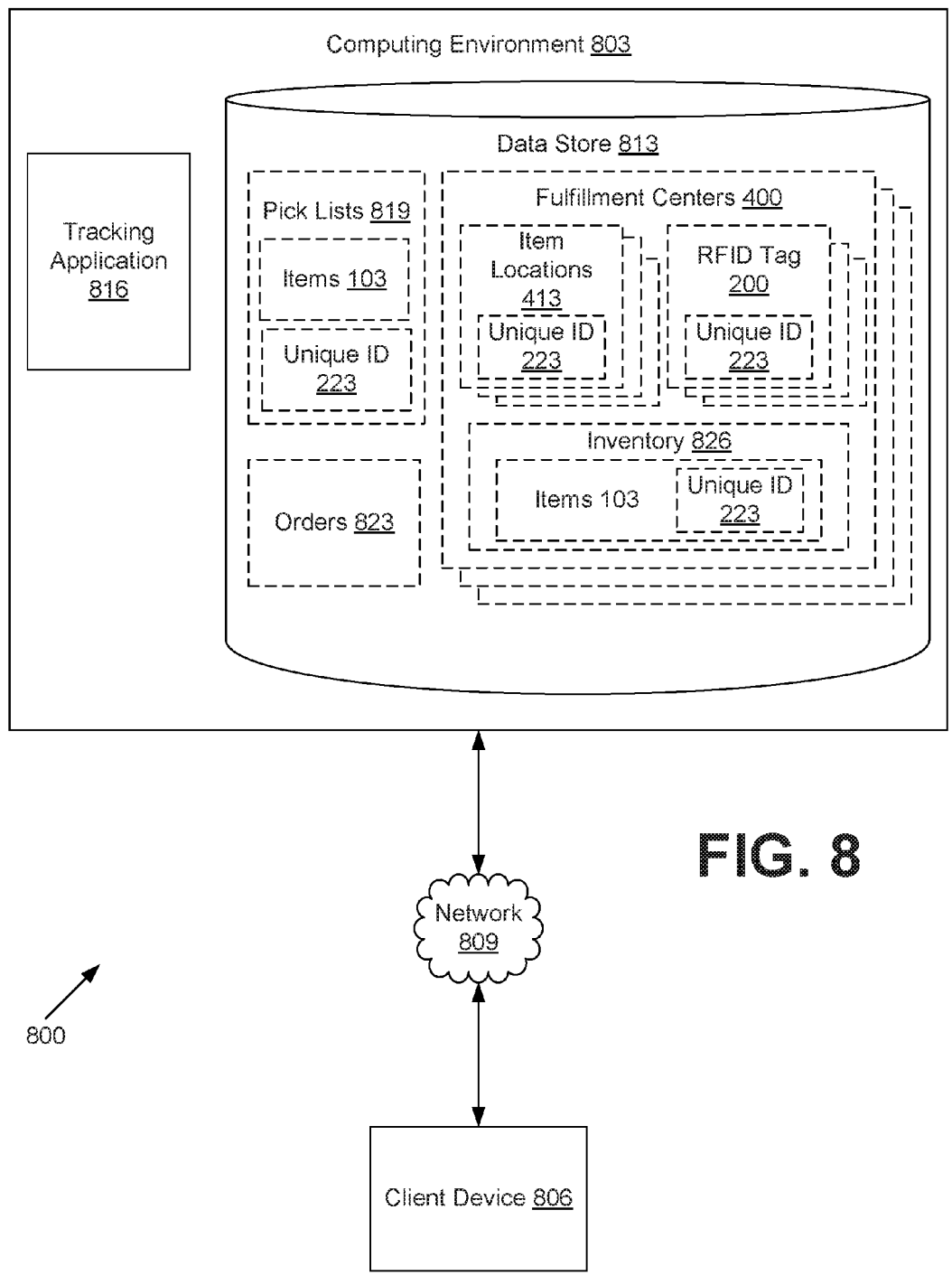
FIG. 8 is a drawing of a networked environment according to various embodiments of the present disclosure.

With reference to FIG. 8, shown is a networked environment 800 according to various embodiments. The networked environment 800 includes a computing environment 803 and a client device 806, which are in data communication with each other via a network 809. The network 809 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 803 may comprise, for example, a server computer or any other system providing computing capability. Alternatively, the computing environment 803 may employ a plurality of computing devices that may be arranged, for example, in one or more server banks or computer banks or other arrangements. Such computing devices may be located in a single installation or may be distributed among many different geographical locations. For example, the computing environment 803 may include a plurality of computing devices that together may comprise a hosted computing resource, a grid computing resource and/or any other distributed computing arrangement. In some cases, the computing environment 803 may correspond to an elastic computing resource where the allotted capacity of processing, network, storage, or other computing-related resources may vary over time.

Various applications and/or other functionality may be executed in the computing environment 803 according to various embodiments. Also, various data is stored in a data store 813 that is accessible to the computing environment 803. The data store 813 may be representative of a plurality of data stores 813 as can be appreciated. The data stored in the data store 813, for example, is associated with the operation of the various applications and/or functional entities described below.

The components executed on the computing environment 803, for example, include a tracking application 816 as well as other applications, services, processes, systems, engines, or functionality not discussed in detail herein. The tracking application 816 is executed to determine whether items 103 in pick lists 819 have been retrieved from inventory 826 at appropriate item locations 413, as well as track the movements of items 103 based on their corresponding RFID tags 200 (FIG. 2). The tracking application 816 may make these determinations based at least in part on information supplied by client devices 806, such as RFID readers 113 (FIG. 1A)

and/or signal strength meters 116 (FIG. 1A) that may be included in RFID tag identification devices 109 (FIG. 1A) or RFID reader stations 300 (FIG. 3).

The data stored in the data store 813 includes, for example, data related to pick lists 819, orders 823, data related to fulfillment centers 400, and potentially other data. For each fulfillment center 400, the data store 813 may also store data related to an inventory 826 of items 103 at each fulfillment center 400, the item locations 413 in each fulfillment center 400 where one or more items 103 of inventory may be stored, and data related to RFID tags 200 associated with individual items 103 of inventory 826, such as the unique identifier 223 for each RFID tag 200 used at a fulfillment center 400. For each pick list 819, the data store 813 may also track or store information related to items 103 included in the pick list 819.

A pick list 819 includes a list of items 103 to be retrieved from the inventory 826 of a fulfillment center 400 by a picker 100 (FIG. 1A). The pick list 819 may include one or more items 103 to be retrieved from inventory 826. The items 103 included in the pick list 819 may correspond to one or more orders 823. In some embodiments, the pick list 819 may also include the item location 413 for each item 103 in the pick list 819, a unique identifier 223 of an RFID tag 200 corresponding to an item 103 in the pick list 819, a route between item locations 413 of the items 103 to be retrieved, and/or potentially other data.

Orders 823 are representative of one or more customer orders 823 placed through an electronic commerce application for purchase and/or lease of one or more items 103. Individual orders 823 may correspond to a single pick list 819 or multiple pick lists 819, each of which may contain one or more items 103 included in the order 823. Further, individual orders 823 may be fulfilled from one or more fulfillment centers 400. For example, a customer may place an order 823 for three items 103. The first item 103 may be shipped from a first fulfillment center 400 and the remaining two items 103 may be shipped from a second fulfillment center 400. Further, the two items 103 shipped from the second fulfillment center 400 may be included in a single pick list 819 for retrieval by a single picker 100 or may be included in different pick lists 819 for simultaneous or near simultaneous retrieval by two pickers 100.

The client device 806 is representative of any one or more of a plurality of client devices that may be coupled to the network 809, such as RFID reader stations 300 (FIG. 3), RFID tag identification devices 109 (FIG. 1A), or other computing devices that implement similar functionality. For example, the client device 806 may include a processor-based system such as a computer system. The client device 806 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 806 may be configured to execute various applications. These applications may be executed in a client device 806, for example, to access content served by the computing environment 803 and/or other servers, thereby rendering a user interface on the display. To this end, the client application may comprise, for example, a browser, a dedicated application, etc., and the user interface may comprise a network page, an application screen, etc. Client applications may also be executed to submit data to the tracking application 816 or other applications executing in the computing environment 803. In some embodiments, the client device 806 may be further configured to execute applications beyond the client application such as, for example, email applications, social networking applications, word processors, spreadsheets, and/or other applications.

Next, a general description of the operation of the various components of the networked environment 800 is provided. To begin, the tracking application 816 receives a unique identifier 223 of an RFID tag 200 from a client device 806, such as a RFID tag identification device 109 attached to a picker 100. The tracking application 816 then determines whether the unique identifier 223 of the RFID tag 200 corresponds to an item 103 in a pick list 819 associated with the picker 100. If the tracking application 816 determines that the unique identifier 223 received from the client device 806 matches a unique identifier 223 of an item 103 in a pick list 819 assigned to the picker 100, then the tracking application 816 marks the item 103 in the pick list 819 and/or the order 823 as having been retrieved by the picker 100. However, if the unique identifier 223 received from the client device 806 does not match the unique identifier 223 of the item 103 in the pick list 819, then the tracking application 816 sends an error message to the client device 806. The error message may notify the picker 100 that the wrong item 103 at the item location 413 has been retrieved. In some embodiments, the error message may contain additional instructions for the picker 100, such as the name and description of the item 103 to be retrieved from the item location 413 and/or other information.

In another embodiment, the tracking application 816 receives a plurality of unique identifiers 223 corresponding to a plurality of RFID tags 200 for individual items 103 of inventory 826 located at a particular item location 413. The plurality of unique identifiers 223 for the plurality of RFID tags 200 may, for example, be transmitted from a client device 806, such as an RFID reader station 300 (FIG. 3). The tracking application 816 then compares each of the received unique identifiers 223 with those unique identifiers 223 stored in association with the particular item location 413. If the tracking application 816 detects a mismatch, then the tracking application 816 may send an error message to an inventory management system or may initiate other types of corrective action.

A mismatch may result from a number of conditions. A mismatch may, for example, occur when a unique identifier 223 for an item 103 is reported as not being present at the particular item location 413 when the information stored in the data store 813 indicates that the item 103 corresponding to the unique identifier 223 at issue should be present at the particular item location 413. A mismatch may also occur, for example, when a unique identifier for an item 103 is reported as being present at the particular item location 413 when the information stored in the data store 813 indicates that the item 103 corresponding to the unique identifier 223 at issue should not be present at the particular item location 413.

Figure 9:
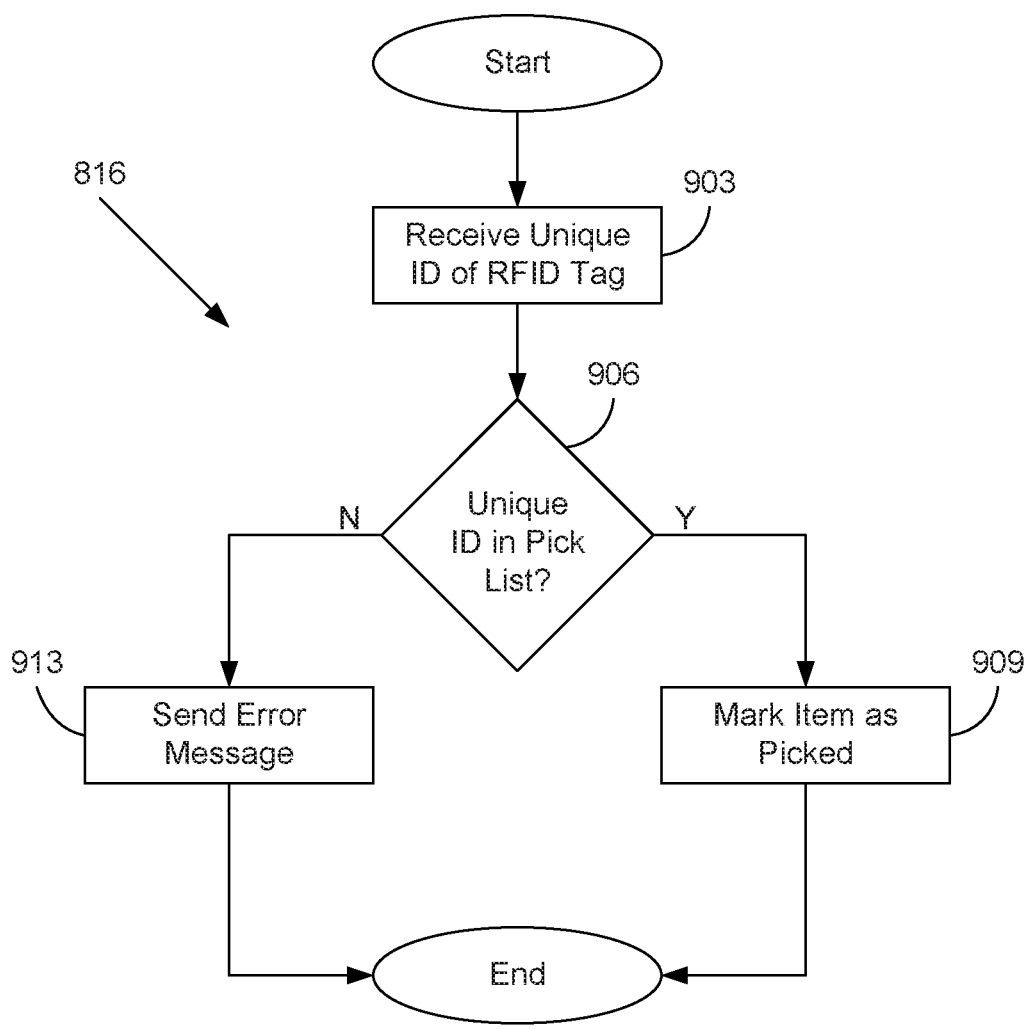
FIG. 9 is a flowchart illustrating one example of functionality implemented as portions of an application executed in a computing environment in the networked environment of FIG. 8 according to various embodiments of the present disclosure.

Referring next to FIG. 9, shown is a flowchart that provides one example of the operation of a portion of the tracking application 816 according to various embodiments. It is understood that the flowchart of FIG. 9 provides merely an example of the many different types of functional arrangements that may be employed to implement the operation of the portion of the tracking application 816 as described herein. As an alternative, the flowchart of FIG. 9 may be viewed as depicting an example of elements of a method implemented in the computing environment 803 (FIG. 8) according to one or more embodiments.

Beginning with box 903, the tracking application 816 receives a unique identifier 223 (FIG. 2B) from a client device 806 (FIG. 8) in proximity to a picker 100 (FIG. 1A), such as a RFID tag identification device 109 (FIG. 1A). For example, the RFID tag identification device 109 may have selected a unique identifier 223 of an RFID tag 200 in response to determining that the RFID tag 200 is moving, as previously described in FIGS. 5 and 6.

Proceeding to box 906, the tracking application 816 determines whether the unique identifier 223 received from the client device 806 matches a unique identifier 223 for an item 103 in a pick list 819. If the unique identifier 223 received from the client device 806 matches a unique identifier 223 for an item 103 in the pick list 819, then execution proceeds to box 909. If the unique identifier 223 received from the client device 806 does not match a unique identifier 223 for an item 103 in the pick list 819, then execution proceeds to box 913.

Moving on to box 909, the tracking application 816 marks the item 103 corresponding to the unique identifier 223 as having been retrieved or "picked." In some embodiments, this may include modifying appropriate records stored in association with the appropriate pick list 819, order 823 (FIG. 8), and/or inventory 826 (FIG. 8) of the appropriate fulfillment center 400 (FIG. 4). Execution subsequently ends.

Referring next to box 913, the tracking application 816 sends an error message to the client device 806. The error message may, for example, indicate to the picker 100 that the wrong item 103 has been retrieved from the item location 413. In some embodiments, the error message may further instruct the picker 100 to retrieve the correct item 103. In such embodiments, the error message may also, for example, include a description of the correct item 103 to be retrieved. The description may, in some embodiments, include an image of the correct item 103 to be retrieved. Execution subsequently ends.

Figure 10:
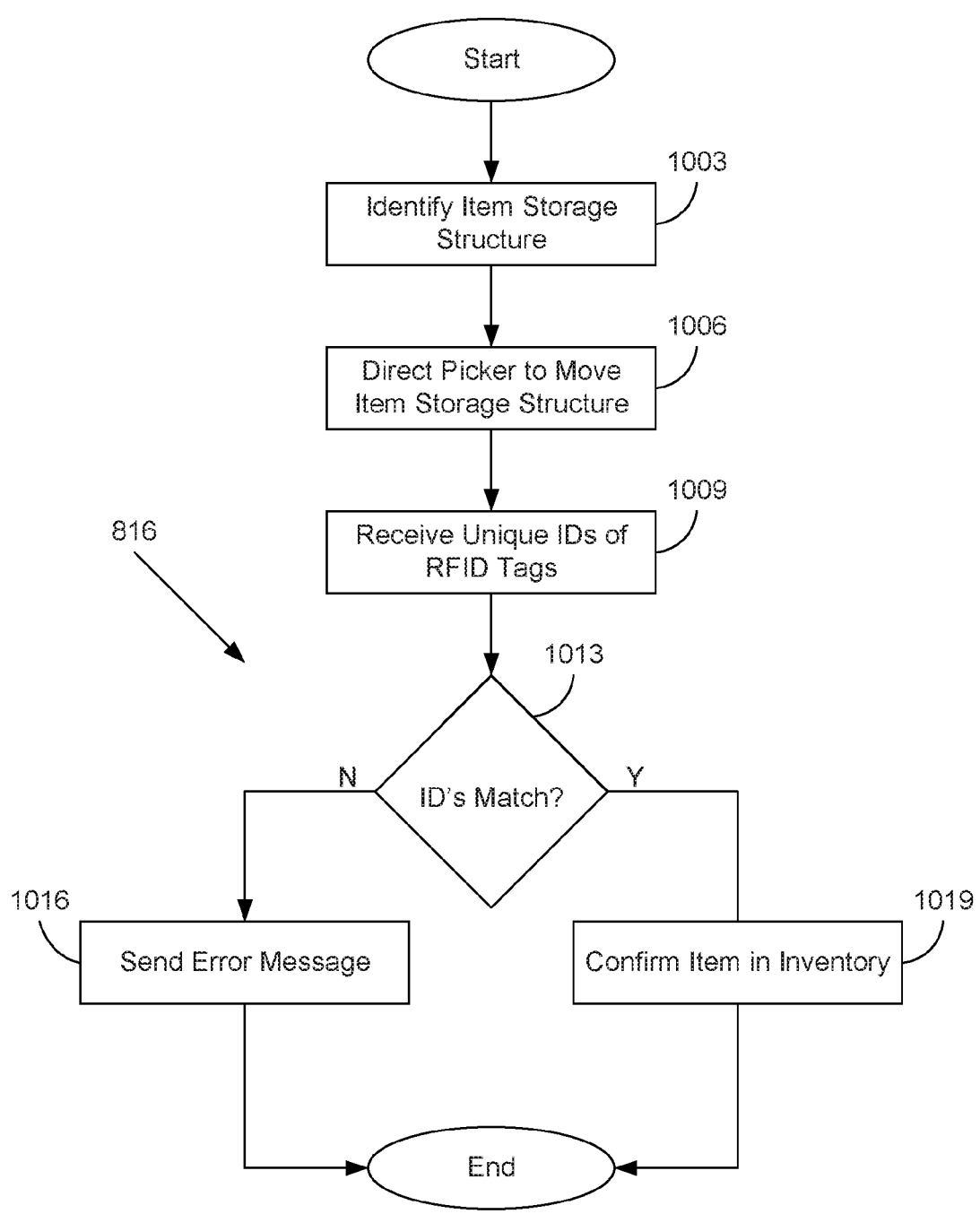
FIG. 10 is a flowchart illustrating one example of functionality implemented as portions of an application executed in a computing environment in the networked environment of FIG. 8 according to various embodiments of the present disclosure.

Referring next to FIG. 10, shown is a flowchart that provides one example of the operation of a portion of the tracking application 816 according to various embodiments. It is understood that the flowchart of FIG. 10 provides merely an example of the many different types of functional arrangements that may be employed to implement the operation of the portion of the tracking application 816 as described herein. As an alternative, the flowchart of FIG. 10 may be viewed as depicting an example of elements of a method implemented in the computing environment 803 (FIG. 8) according to one or more embodiments.

Beginning with box 1003, the tracking application 816 identifies an item storage structure 106 (FIG. 3) that is to have its contents verified. The item storage structure 106 may be selected, for example, as part of a routine inventory audit or in response to a previously detected inventory discrepancy involving the item storage structure 106.

Referring next to box 1006, the tracking application 816 directs a picker 100 (FIG. 3) to move the item storage structure 106 to an RFID reader station 300 (FIG. 3) and to subsequently rotate the item storage structure 106 in the vicinity of the RFID reader station 300 in a manner similar to that depicted in FIG. 3. As previously discussed, the picker 100 may be, for example, an autonomous robot or an employee equipped, for example, with a hand truck, dolly, forklift, or other device appropriate for moving and manipulating a particular item storage structure 106.

Moving on to box 1009, the tracking application 816 receives one or more unique identifiers 223 (FIG. 2B) from a client device 806 (FIG. 8) in proximity to a picker 100 (FIG. 3), such as an RFID reader station 300 in response to the picker 100 rotating the item storage structure 106 in the vicinity of the RFID reader station 300. The one or more unique identifiers 223 represent those items 103 (FIG. 8) located at a particular item storage location 413 (FIG. 8).

Proceeding to box 1013, the tracking application 816 determines whether the received unique identifiers 223 match the unique identifiers 223 (FIG. 8) for items 103 (FIG. 8) that are expected to be located in the item storage structure 106 at the item storage location 413. When a large number of unique identifiers 223 are received, such as from RFID tags 200 (FIG. 2) in multiple item storage structures within range of the RFID reader 303 (FIG. 3) of the RFID reader station 300, the tracking application 816 may first filter the received unique identifiers 223. For example, the RFID reader 303 may energize RFID tags 200 of items 103 in the item storage structure 106 as well as RFID tags 200 of items 103 in nearby item storage structures 106. However, because the tracking application 816 has directed a picker 100 to rotate a single item storage structure 106 in proximity to the RFID reader station 300, the tracking application 816 may select only those unique identifiers 223 that are associated with RFID tags 200 that are in motion. Whether an RFID tag 200 is in motion may be determined using one or more of the approaches previously discussed in FIG. 5 and FIG. 6. In the event that multiple item storage structures 106 are in motion, such as when a second picker 100 is moving a nearby item storage structure 106 past the rotating item storage structure 106, the tracking application 816 may use approaches, such as those previously described in FIG. 7, to identify the unique identifiers 223 of RFID tags 200 that are rotating in a circular motion. In such embodiments, the tracking application 816 compares the unique identifiers 223 of the filtered RFID tags 200 with unique identifiers 223 of items 103 expected to be located in the item storage structure 106. If the tracking application 816 determines that there is a mismatch between the received unique identifiers 223 and the unique identifiers 223 representing items 103 that are expected to be located in the item storage structure 106, then execution proceeds to box 1016. If no mismatch exists, then execution proceeds to box 1019.

Referring next to box 1016, the tracking application 816 sends an error message to an inventory management system, inventory control system, and/or similar system that may initiate a process to correct the mismatch. The message may, for example, include the details such as a list of items 103 that were not reported as being present in the item storage structure 106 at the item location 413 or a list of items 103 that were reported as being present in the item storage structure 106 at the item location 413 but should not have been. Mismatches may indicate, for example, that an item 103 was incorrectly retrieved to fulfill an order 823 at some point previously, that an item 103 was incorrectly recorded as being stored at a particular item location 413, that an item 103 may have been stolen, and/or other scenarios. Execution subsequently ends.

However, proceeding to box 1019, the tracking application 816 confirms that unique identifiers 223 of RFID tags 200 (FIG. 2) of items 103 detected in the item storage structure 106 at the item location 413 match the set of expected unique identifiers 223. Confirmation may involve marking individual items 103 in the inventory 826 of a fulfillment center 400 as present or "in inventory" at a specific data and/or time. Confirmation may also involve sending a message to an inventory management system, inventory control system, and/or similar system with a notification that item 103 is present in the inventory 826 as expected.

Figure 11:
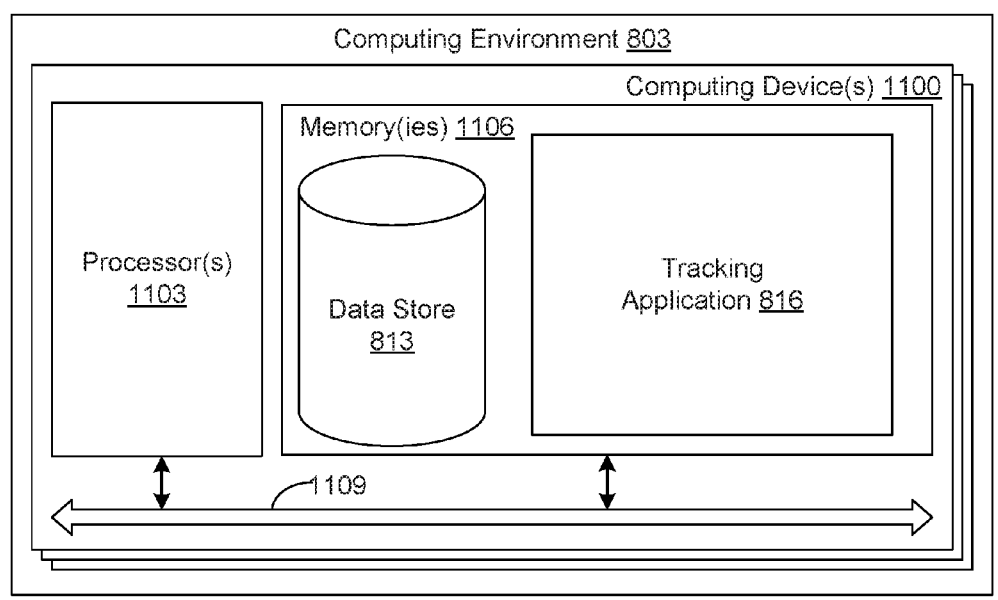
FIG. 11 is a schematic block diagram that provides one example illustration of a computing environment employed in the networked environment of FIG. 8 according to various embodiments of the present disclosure.

With reference to FIG. 11, shown is a schematic block diagram of the computing environment 803 according to an embodiment of the present disclosure. The computing environment 803 includes one or more computing devices 1100. Each computing device 1100 includes at least one processor circuit, for example, having a processor 1103 and a memory 1106, both of which are coupled to a local interface 1109. To this end, each computing device 1100 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the tracking application 816 and/or potentially other applications. Also stored in the memory 1106 may be a data store 813 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective-C®, Java®, JavaScript®, Perl®, PHP®, Visual Basic®, Python®, Ruby®, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and/or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the tracking application 816, portions of the RFID tag identification device 109 (FIG. 1A), portions of the RFID tag 200 (FIGS. 2A and 2B), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9 and 10 show the functionality and operation of an implementation of portions of the tracking application 816, while the flowcharts of FIGS. 5, 6, and 7 show the functionality and operation of an implementation of portions of the RFID tag identification device 109 and/or the RFID reader station 300. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 5, 6, 7, 9 and 10 show a specific order of execution, it is understood that the order of execution may differ from that which is depicted. For example, the order of execution of two or more blocks may be scrambled relative to the order shown. Also, two or more blocks shown in succession in FIGS. 5, 6, 7, 9 and 10 may be executed concurrently or with partial concurrence. Further, in some embodiments, one or more of the blocks shown in FIGS. 5, 6, 7, 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the tracking application 816 and various portions of the RFID tag identification device 109, RFID reader station 300, and/or RFID tag 200 (FIG. 2A), that comprises software or code can be embodied in any non-transitory computer-readable medium for use by or in connection with an instruction execution system such as, for example, a processor 1103 in a computer system or other system, portions of a RFID tag identification device 109, RFID reader station 300 and/or a microchip 206 in an RFID tag 200. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the tracking application 816, portions of the RFID tag identification device 109, portions of the RFID reader station 300, and/or the RFID tag 200, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1100, or in multiple computing devices in the same computing environment 803. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system, comprising:
    a robotic picker configured to move an item storage structure containing a plurality of items, wherein individual ones of the plurality of items have a radio frequency identification (RFID) tag affixed; and
    an RFID tag identification device configured to:
        energize a plurality of RFID tags affixed to respective ones of the plurality of items;
        receive a respective plurality of responses from respective ones of the plurality of RFID tags, each of the respective plurality of responses from the respective ones of the plurality of RFID tags comprising velocity data for the respective ones of the plurality of RFID tags;
        determine that a particular RFID tag within the plurality of RFID tags is in motion based at least in part on the velocity data in a respective response received from the particular RFID tag; and
        determine an identifier for the particular RFID tag.

2. The system of claim 1, wherein, to determine that the particular RFID tag is in motion, the RFID tag identification device is further configured to receive acceleration data from the particular RFID tag, wherein the acceleration data indicates that the particular RFID tag is moving.

3. The system of claim 1, wherein, to determine that the particular RFID tag is in motion, the RFID tag identification device is further configured to detect a change in an electric field strength of the particular RFID tag.

4. The system of claim 1, wherein:
    the RFID tag identification device further comprises an RFID reader; and
    the robotic picker is further configured to rotate the item storage structure in place within range of the RFID reader.

5. The system of claim 1, wherein the identifier comprises a first identifier and the system further comprises a computing device in network communication with the RFID tag identification device, the computing device comprising a processor, a memory, and machine readable instructions stored in the memory that, when executed by the processor, cause the computing device to determine that the first identifier for the particular RFID tag matches a second identifier of an item located in the item storage structure.

6. The system of claim 1, wherein the identifier is a first identifier and the system further comprises a computing device in network communication with the RFID tag identification device, the computing device comprising a processor, a memory, and machine readable instructions stored in the memory that, when executed by the processor, cause the computing device to determine that the first identifier for the particular RFID tag matches a second identifier of an item included in a pick list associated with the robotic picker.

7. A system, comprising:
    a robotic picker configured to move an item storage structure containing a plurality of items, wherein individual ones of the plurality of items have a radio frequency identification (RFID) tag affixed; and
    an RFID tag identification device configured to:
        energize a plurality of RFID tags comprising the plurality of RFID tags affixed to respective ones of the plurality of items;

receive a respective plurality of responses from respective ones of the plurality of RFID tags, each of the respective plurality of responses including acceleration data for the respective ones of the plurality of RFID tags, wherein the acceleration data indicates whether the respective ones of the plurality of RFID tags are in motion;

determine that a particular RFID tag within the plurality of RFID tags is in motion based at least in part on the acceleration data included in a respective response received from the particular RFID tag;

determine a first identifier for the particular RFID tag; and send the first identifier to a computing device; and the computing device being in network communication with the RFID tag identification device, wherein the computing device comprises a processor, a memory, and machine readable instructions stored in the memory that, when executed by the processor, cause the computing device to determine that the first identifier for the particular RFID tag matches a second identifier for an item on a pick list.

8. The system of claim 7, wherein the pick list is associated with the robotic picker.

9. The system of claim 8, wherein, to determine that the particular RFID tag is in motion, the RFID tag identification device is further configured to receive velocity data from the particular RFID tag, wherein the velocity data indicates that the particular RFID tag is moving.

10. The system of claim 9, wherein:
the RFID tag identification device further comprises an RFID reader; and
the robotic picker is further configured to rotate the item storage structure in place within range of the RFID reader.

11. The system of claim 7, wherein, to determine that the particular RFID tag is in motion, the RFID tag identification device is further configured to detect a change in an electric field strength of the particular RFID tag.

12. The system of claim 7, wherein:
the RFID tag identification device further comprises an RFID reader; and
the robotic picker is further configured to rotate the item storage structure around the RFID reader.

13. The system of claim 7, wherein the machine readable instructions of the computing device, when executed by the processor, further cause the computing device to determine that the item in the pick list is located in the item storage structure based at least in part on a match of the first identifier to the second identifier.

14. A method, comprising:

moving, with a robotic picker, an item storage structure within range of a radio frequency identification (RFID) tag reader, wherein the item storage structure comprises a plurality of items and individual ones of the plurality of items have an RFID tag affixed;

emitting, from a RFID tag reader, an electric field;

moving, with the robotic picker, the item storage structure while the RFID tag reader emits the electric field;

receiving, with an RFID tag identification device, responses from a plurality of energized RFID tags affixed to the plurality of items;

detecting, with the RFID tag identification device, a change in an electric field strength of each one of the plurality of energized RFID tags affixed to the plurality of items;

determining, with the RFID tag identification device, that a particular energized RFID tag from the plurality of energized RFID tags is in motion based at least in part on the change in the electric field strength of the particular energized RFID tag; and selecting, with the RFID tag identification device, an identifier broadcast by the particular energized RFID tag that is in motion.

15. The method of claim 14, further comprising determining that an item is located within the item storage structure based at least in part on the identifier broadcast by particular energized RFID tag that is in motion.

16. The method of claim 14, wherein determining that the particular energized RFID tag is in motion further comprises receiving velocity data from the particular energized RFID tag, wherein the velocity data indicates that the particular energized RFID tag is moving.

17. The method of claim 14, wherein determining that the particular energized RFID tag is in motion further comprises receiving acceleration data from the particular energized RFID tag, wherein the acceleration data indicates that the particular energized RFID tag is moving.

18. The method of claim 14, wherein moving the item storage structure while the RFID tag reader emits the electric field further comprises rotating in place, with the robotic picker, the item storage structure.

19. The method of claim 14, wherein moving the item storage structure while the RFID tag reader emits the electric field further comprises moving, with the robotic picker, the item storage structure around the RFID tag identification device.

20. The method of claim 14, further comprising sending, from the RFID tag identification device, the identifier to a remote computing device to determine that at least one of the plurality of items associated with the particular energized RFID tag is included in a pick list.

* * * * *